United States Patent Office 3,631,100
Patented Dec. 28, 1971

3,631,100
PROCESS FOR THE PREPARATION OF USEFUL
$N_2O_3$ ADDITION PRODUCTS AND FATTY ACIDS
Alan F. Ellis, Murrysville, Pa., assignor to Gulf Research
 & Development Corporation, Pittsburgh, Pa.
No Drawing. Filed Dec. 9, 1968, Ser. No. 782,441
Int. Cl. C07c 53/22
U.S. Cl. 260—533 R         13 Claims

ABSTRACT OF THE DISCLOSURE 1-alkenes, such as 1-octene, can be substantially completely converted to useful $N_2O_3$ addition products by reaction with a nitrosating agent comprising a mixture of NO and $NO_2$ wherein the molar ratio of NO to $NO_2$ is at least 1:1, provided the conversion occurs in the presence of a lower alkyl fatty acid such as acetic acid. The $N_2O_3$ addition products can be converted in good efficiency to a fatty acid by reaction with concentrated sulfuric or phosphoric acid, followed, if necessary or if desired, after gas evolution has ceased, by dilution with water to an anhydrous mineral acid content of less than 65 and heating to obtain the desired fatty acid, such as heptanoic acid.

This invention relates to the preparation of useful $N_2O_3$ addition products and in particular to the preparation of fatty acids from 1-alkenes.

It is known in the art that a mixture of gaseous NO and $NO_2$ in a molar ratio of 1:1 ($N_2O_3$) will react with 1-alkenes to produce an alpha-nitro-nitroso-alkane as shown below:

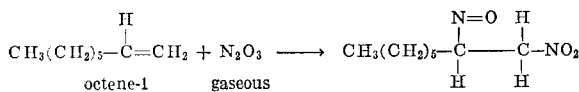

As is described in U.S. Pat. No. 3,379,710 to Alan F. Ellis issued Apr. 23, 1968, the nitro-nitroso monomers tend under low temperature conditions to dimerize through the nitroso group to form, what are known in the art as, bis(1-nitro-2-nitrosoalkanes). It is taught in the '710 Ellis patent that to obtain high yields of recoverable solid white dimeric nitro-nitroso compounds it is necessary to not only keep the temperature low but to also keep the molar ratio of the nitrosating agent to the 1-alkene below 0.5.

It is also taught in the '710 Ellis patent that at a stoichiometric ratio of the nitrosating agent to olefin above 0.5, there is enough by-product to effect solubilization of the desired dimer which tends to form monomer which in turn tends to decompose to form more undesired by-products.

It would be desirable to be able to utilize a nitrosating agent to olefin molar ratio of above 0.5, preferably above 0.8, and more particularly about 1:1 and still obtain high yields of useful $N_2O_3$ addition products. In this manner it would be possible to substantially completely convert the 1-alkene and thus avoid the necessity of separating and recycling any unconverted 1-alkene.

It has now been found that 1-alkenes can be reacted with a nitrosating agent to obtain substantially complete conversion of the 1-alkene to a high yield of useful $N_2O_3$ addition products, provided the reaction between the nitrosating agent and the 1-alkene occurs in the presence of a lower alkyl fatty acid solvent, such as acetic acid.

It is not understood how the lower alkyl fatty acid solvent functions, but it is believed it in some manner stabilizes the useful $N_2O_3$ addition products comprising monomeric 1-nitro-2-nitrosoalkanes; bis(1-nitro-2-nitrosoalkanes); and 1-nitroalkanone-2 oximes to prevent their decomposition to useless by-products.

By "useful $N_2O_3$ addition products" is meant that at least 50 weight percent of the $N_2O_3$-1-alkene addition products are capable of conversion to a fatty acid having one less carbon atom than the 1-alkene by reaction of the $N_2O_3$ addition products with sulfuric acid having an $H_2SO_4$ content of about 80 weight percent.

In accordance with the invention, a 1-alkene is converted to useful $N_2O_3$ addition products by a process which comprises: reacting a charge stock comprising a 1-alkene having from 3 to 25 carbon atoms with a nitrosating agent comprising a mixture of NO and $NO_2$ wherein the molar ratio of NO to $NO_2$ is at least 1:1 in a substantially anhydrous reaction medium comprising said charge stock, said nitrosating agent and a solvent consisting of a lower alkyl fatty acid having from one to three carbon atoms; under conditions of temperature and pressure such that said fatty acid solvent and 1-alkene are substantially entirely in the liquid phase and wherein the stoichiometric ratio of said nitrosating agent to said 1-alkene is at least 0.8:1 and wherein the amount of the solvent is at least 50 percent by weight of the nitrosating agent free reaction medium.

The 1-alkene charge stock is a monoolefinic hydrocarbon having from 3 to 25 carbon atoms, preferably from 6 to 18 carbon atoms. Mixtures of 1-alkenes can also be employed.

The 1-alkenes have the formula:

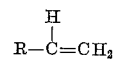

where R is a saturated hydrocarbon radical having from 1 to 23 carbon atoms, preferably from 3 to 16 carbon atoms.

Suitable 1-alkenes can be obtained from any source, such as from the telomerization of ethylene using an aluminum trialkyl catalyst. Cracked wax olefins are also suitable, although not as desirable.

Examples of suitable 1-alkenes include, but are not limited to:

propylene;        4-ethyl-1-hexene;
1-butene;         1-decene;
1-hexene;         1-dodecene;
3-methyl-1-butene;  1-hexadecene; and
1-octene;         1-eicosene.

The nitrosating agent which is useful in the process of this invention consists of a gaseous mixture of NO and $NO_2$ wherein the molar ratio of NO to $NO_2$ is at least 1:1. Pure NO is not suitable in this reaction, but NO with small amounts of $NO_2$ will serve in the process of this invention, since NO in the presence of $NO_2$ and the nitro-nitroso monomer will generate additional $NO_2$ radicals for use in the reaction. Pure $NO_2$ is unsuitable for use in this reaction, and the use of mixtures of NO and $NO_2$ wherein the molar ratio of $NO_2$ to NO is greater than 1:1 is undesirable since unwanted byproducts including dinitro and nitrated olefins will result. Likewise, the use of $N_2O_4$ is not suitable as a nitrosating agent in the process of this invention. Nitrogen trioxide ($N_2O_3$) is suitable for use in the process of this invention as it dissociates into a 1:1 molar mixture of NO and $NO_2$.

The stoichiometric ratio of the nitrosating agent to the 1-alkene is suitably at least 0.8:1, preferably above 0.9:1, and more preferably is from 0.98:1 to 1.02:1. Higher ratios can be used up to about 1.1:1 but serve no added useful purpose and tend to produce unwanted compounds. A 1:1 stoichiometric ratio means one mole of $N_2O_3$ per mole of 1-alkene since it is believed one molecule of NO and one molecule of $NO_2$ add across the olefinic double bond to produce a 1-nitro-2-nitrosoalkane.

The reaction of the nitrosating agent with the 1-alkene is an exothermic reaction and care must be taken to avoid local overheating. Preferably the nitrosating agent is added to the 1-alkene in the solvent with vigorous stirring at a rate substantially as quickly as the nitrosating agent reacts.

The solvent is a lower alkyl fatty acid having from one to three carbon atoms. These lower alkyl fatty acids include formic, acetic and propionic acids. Acetic acid is preferred.

The amount of solvent fatty acid to employ is not critical, but the amount should be sufficient to maintain the charge stock and addition products in a single phase under the conditions of the reaction. Suitable amounts of fatty acid solvent are from 50 to 90 weight percent of the reaction medium, the reaction medium being total weight of solvent and 1-alkene. The preferred amounts of solvent are from 65 to 85 weight percent of the reaction medium. The preferred solvent is glacial acetic acid.

In general, the reaction can be carried out at a temperature between about 0° C. and 100° C. The reaction preferably is carried out at a temperature from 10° to 60° C. and more preferably at a temperature from 20° to 50° C'

The reaction pressure will depend somewhat on the exact nature of the nitrosating agent and 1-alkene employed. The pressure should be sufficient to maintain the 1-alkene in the liquid phase. If $N_2O_3$ is employed, the pressure is preferably atmospheric so that in reality a gaseous mixture of NO and $NO_2$ in a 1:1 molar ratio is added. If NO with only small amounts of $NO_2$ is used, increased reaction pressures aid in the desired reaction since an increased pressure aids in the formation of $NO_2$ from the NO in the presence of the nitro-nitroso monomers. As the molar ratio of $NO_2$ to NO which is used as the nitrosating agent is increased to a maximum of about 1:1, then the maximum pressure which can be tolerated decreases. The optimum temperature and pressure will therefore vary depending on the exact nitrosating agent and 1-alkene. As a general range, the reaction pressure can vary between 0.5 and 20 atmospheres with the preferred pressures depending on the nitrosating agent and 1-alkene as taught above.

The addition of the nitrosating agent to the olefinic hydrocarbon is an exothermic reaction and the rate of addition should be so regulated together with cooling means to maintain the temperature of reaction within the range desired.

The reaction time depends upon the olefin conversion desired and the temperature control efficiency of the reactor. The reaction time is simply that amount of time required to add the desired amount of nitrosating agent at a rate which permits good temperature control, for the reaction between the olefin and nitrosating agent is substantially instantaneous. In general, the reaction time is between 0.5 and 10 hours or more with the usual reaction time being between one and three hours.

It has been found that nitrosating 1-alkenes by the above procedure allows for substantially complete conversion of the 1-alkene to useful $N_2O_3$ addition products. It is particularly desired to convert the above $N_2O_3$ addition products to an organic reaction product comprising at least one compound having from 2 to 24 carbon atoms selected from the group consisting of a fatty acid, a fatty acid amide and an alkyl nitrile by contacting the $N_2O_3$ addition products with a strong mineral acid selected from the group consisting of sulfuric and phosphoric acids. Fortuitously, the lower alkyl fatty acid solvent used in the production of the useful $N_2O_3$ addition products is resistant to attack by the sulfuric and phosphoric acids, even in anhydrous forms, so that no separation of fatty acid solvent or other materials is required before the addition of the sulfuric or phosphoric acids to produce the desired fatty acids from the $N_2O_3$ addition products.

Thus, in accordance with this aspect of the invention, an organic reaction product comprising at least one compound having from 2 to 24 carbon atoms selected from the group consisting of a fatty acid, a fatty acid amide and an alkyl nitrile is prepared by a process which comprises: reacting a charge stock comprising a 1-alkene having from 3 to 25 carbon atoms with a nitrosating agent comprising a mixture of NO and $NO_2$ wherein the molar ratio of NO to $NO_2$ is at least 1:1 in a substantially anhydrous first reaction medium wherein the stoichiometric ratio of said nitrosating agent to said 1-alkene is greater than 0.8:1 and in the presence of a solvent comprising a fatty acid having from one to three carbon atoms and wherein the amount of said fatty acid solvent is at least 50 percent by weight of said nitrosating agent free reaction medium; thereafter, without any intermediate separation, contacting said first reaction medium with a mineral acid selected from the group consisting of sulfuric and phosphoric acid having a molar ratio of anhydrous mineral acid to water of at least 1.6:1 and wherein the molar ratio of the anhydrous mineral acid to the 1-alkene is at least 1:1 under reaction conditions including a temperature from about 60° to 160° C. for a time at least sufficient for gas evolution to substantially cease; and thereafter recovering said organic product.

In one preferred aspect of the invention, the useful $N_2O_3$ addition products are contacted with aqueous sulfuric or phosphoric acid where the anhydrous mineral acid content of the aqueous mineral acid is at least 90 weight percent and sufficient aqueous mineral acid is used to provide at least a 1:1 molar ratio of water to 1-alkene to produce a product comprising a fatty acid.

When the useful $N_2O_3$ addition products are reacted with anhydrous sulfuric or phosphoric acid, a fatty acid amide having one less carbon atom than the 1-alkene will be produced.

By "anhydrous sulfuric acid" is meant sulfuric acid having an $H_2SO_4$ content of 100 percent and fuming sulfuric acid (oleum) which consists of a solution of $SO_3$ in 100 percent sulfuric acid. By "anhydrous phosphoric acid" is meant any polyphosphoric acid well known in the art having an $H_2O/P_2O_5$ ratio of three or less. The polyphosphoric acids can be quite viscous but, fortuitously, the lower alkyl fatty acid solvent is present with the useful $N_2O_3$ addition products and reduces the viscosity to a workable region. More fatty acid solvent can be added if desired.

If anhydrous mineral acid is employed, the amount can be as low as five weight percent and is preferably from 25 to 95 weight percent, more preferably from 50 to 80 weight percent of the total amount of anhydrous 100 percent acid plus fatty acid solvent present in the reaction medium.

The molar ratio of the anhydrous mineral acid to the 1-alkene is suitably from 1:1 to 50:1 with the preferred molar ratios from 1.5:1 to 5:1.

When the useful $N_2O_3$ addition products are reacted with aqueous sulfuric or phosphoric acid wherein the molar ratio of anhydrous mineral acid to water is at least 1.6:1, an organic reaction product comprising a fatty acid, a fatty acid amide and an alkyl nitrile is produced, the exact amount of each depending on the amount of water available, the reaction conditions, reaction procedure and whether sulfuric or phosphoric acid is employed. Phosphoric acid is not as good a dehydration agent as sulfuric acid and thus less nitrile would be expected.

It is believed the useful $N_2O_3$ addition products initially react to form the fatty acid amide, which reaction is substantially instantaneous under the temperatures of this reaction. The formation of any alkyl nitrile or fatty acid would be a secondary reaction and slower.

The molar ratio of the aqueous mineral acid, calculated as anhydrous mineral acid, to the 1-alkene can be the same broad range as above, that is, a molar ratio of 1:1 to 50:1 with the preferred molar ratios depending on the primary type of product desired. If a fatty acid is the desired product, then higher molar ratios of acid will be employed to provide the necessary water to hydrolyze the fatty acid amides to the fatty acids. In general, the preferred molar ratios of aqueous mineral acid are from 1.5:1 to 5:1.

The aqueous mineral acid is such that the molar ratio of the anhydrous mineral acid to water is at least 1.6:1. This is a weight percent anhydrous acid of at least 90. Preferably, the molar ratio of the anhydrous mineral acid to water is from 1.6:1 to 14:1 or a weight percent anhydrous mineral acid content in the aqueous mineral acid from 90 to 99 percent.

The entire first reaction medium comprising the useful $N_2O_3$ addition products and the lower alkyl fatty acid is contacted with the sulfuric or phosphoric acid in any suitable manner. For example, the mineral acid can be added to the first reaction medium after the formation of the $N_2O_3$ addition products and the admixture heated to suitable reaction temperatures as defined below. If this procedure is employed, it is preferred to add the mineral acid at a temperature less than 60° C., more preferably at a temperature from 0° to 30° C. The first reaction medium can also suitably be added slowly to a second reaction medium comprising the heated mineral acid, optionally containing some lower alkyl fatty acid solvent as a heat sink temperature control means. It is not preferred to admix hot mineral acid with the hot first reaction medium since it would be difficult to control the temperatures of the ensuing reaction. The useful $N_2O_3$ addition products are subject to thermal degradation and care must be taken to avoid temperatures above the limits specified below. The reaction can also be run in a continuous manner by admixing a stream of an aqueous mineral acid with a stream of the first reaction medium admixture in a reactor such as a coil reactor under appropriate reaction conditions.

The preferred method of reaction is to utilize a single batch reactor and by varying reaction conditions and sequentially adding reactants, a 1-alkene can be converted to a fatty acid having one less carbon atom without any intermediate handling or separation of products.

The conditions for reacting the useful $N_2O_3$ addition products with the sulfuric or phosphoric acid in the second reaction medium are not critical and include a temperature from 60° to 160° C., preferably 60° to 120° C., and a reactor pressure from 14 to 200 p.s.i.g., preferably atmospheric pressure.

The reaction in the second reaction medium is very fast, as noted above, and is accompanied by gas evolution, believed to be $CO_2$ and $N_2$. The reaction time should be at least sufficient to allow for the gas evolution to substantially cease which is an indication that the primary reaction, believed to be the formation of the fatty acid amide, is substantially complete. This reaction time can be as short as one second or as long as 120 minutes, but is usually from one to 30 minutes. This reaction should be allowed to be completed (as noted by a cessation of gas evolution) and the reaction product can then be recovered by water dilution or otherwise, if desired. Further reaction will involve the hydrolysis of the fatty acid amides to fatty acids, providing sufficient water is available for the hydrolysis reaction.

If fatty acids are the product of preference, then sufficient water is preferably added to the second reaction medium after the cessation of gas evolution to form a third reaction medium wherein the anhydrous mineral acid content based on the water plus anhydrous mineral acid only is less than 65 weight percent, preferably 10 to 60 weight percent. Dilution of the second reaction medium with water will reduce the tendency for further reaction of the organic materials in the reaction medium with the more concentrated mineral acid to produce unwanted by-products.

Suitable temperatures for heating the third reaction medium (or the second reaction medium if sufficient water is present for hydrolysis) are from 60° to 100° C. Higher temperatures would require the use of pressure to keep the water in the liquid phase. If higher pressures are used, the maximum temperature should be about 120° C. to prevent any thermal breakdown of the product. Pressures in the range given above for the second reaction medium can be employed. The reaction time for this phase of the reaction is suitably from 30 minutes to five hours or more, preferably from one to two hours.

Additional amounts of the lower alkyl fatty acid solvent can optionally be added when the water is added to maintain the third reaction medium in the preferred one phase, if added fatty acid is even necessary.

The desired reaction products can be recovered by any suitable procedure. One suitable procedure involves cooling the reaction mixture by dilution with cold water. Sufficient cold water should be employed to cause a phase separation. The mineral acid will pass into the aqueous phase while the organic reaction products will form a separate phase which can be separated from the aqueous phase and further treated to recover the fatty acids.

The invention will be further described with reference to the following experimental work.

EXAMPLE 1

In the run for this example, 82 grams of $N_2O_3$ (1.1 mole) were added at a rate of about 1 gram per minute to a stirred solution of 112 grams of 1-octene (1.0 mole) in 500 grams of glacial acetic acid at 23° to 35° C.

Immediately after the addition of the $N_2O_3$, and without any intermediate separation, 200 grams of sulfuric acid (2.0 mole) having in $H_2SO_4$ content of 96 percent was slowly added over a 10 minute period to control the heat of mixing. The resulting solution was heated to about 60° C. where an exothermic reaction commenced. The temperature was held between 60° and 70° C. by cooling. When the exotherm was over (about 10 minutes), the solution was heated to 90° C. for about 15 minutes to insure completeness of the reaction and then diluted with 95 milliliters of water. This diluted reaction medium, which was still a one phase solution, was heated to 90° C. for an additional 90 minutes.

This solution was then cooled to room temperature and diluted with sufficient additional water to spring a separate organic phase which was isolated and distilled to give 60 grams of heptanoic acid.

The conversion of 1-octene was 93 percent, for 13 grams of $N_2O_3$ recovered in the Dry Ice trap indicated 71 grams of $N_2O_3$ had been consumed. The efficiency to the production of heptanoic acid was calculated to be about 50 percent.

Example 1 was repeated using 151 grams of commercial polyphosphoric acid in place of the 96 percent sulfuric acid, and about the same results were achieved.

Resort may be had to such variations and modifications as fall within the spirit of the invention and the scope of the appended claims.

I claim:

1. A process for the conversion of a 1-alkene to useful $N_2O_3$ addition products which comprises:

reacting a charge stock comprising a 1-alkene having from 6 to 18 carbon atoms with a nitrosating agent comprising a mixture of NO and $NO_2$ wherein the molar ratio of NO to $NO_2$ is at least 1:1 in a substantially anhydrous reaction medium comprising said charge stock, said nitrosating agent and a solvent consisting of a lower alkyl fatty acid having from one to three carbon atoms, under conditions of temperature and pressure such that said fatty acid solvent and 1-alkene are substantially entirely in the liquid phase, and wherein the stoichiometric ratio of said nitrosating agent to said 1-alkene is at least 0.8:1 and wherein the amount of the solvent is at least 50 percent by weight of the nitrosating agent free reaction medium.

2. A process according to claim 1 wherein the reaction temperature is from 60° to 160° C. and the nitrosating agent is added at a rate substantially equal to its rate of reaction to a reaction medium comprising said 1-alkene and said solvent.

3. A process for the preparation of an organic reaction product comprising a fatty acid having from 5 to 17 carbon atoms which comprises reacting a charge stock comprising a 1-alkene having from 6 to 18 carbon atoms with a nitrosating agent comprising a mixture of NO and $NO_2$ wherein the molar ratio of NO to $NO_2$ is at least 1:1 in a substantially anhydrous first reaction medium wherein the stoichiometric ratio of said nitrosating agent to said 1-alkene is greater than 0.8:1 and in the presence of a solvent comprising a fatty acid having from 1 to 3 carbon atoms and wherein the amount of said fatty acid solvent is at least 50 percent by weight of said nitrosating agent free reaction medium;

thereafter, without any intermediate separation, contacting said first reaction medium with an aqueous mineral acid selected from the group consisting of aqueous sulfuric and aqueous phosphoric acid where in said aqueous mineral acid, the molar ratio of anhydrous mineral acid to water is at least 1.6:1, and wherein the molar ratio of the anhydrous mineral acid to said 1-alkene is at least 1:1 under reaction conditions including a temperature from about 60° to about 160° C. for a time at least sufficient for gas evolution to substantially cease; and thereafter recovering said organic product.

4. A process according to claim 3 wherein the amount of aqueous mineral acid employed in such that the molar ratio of water to 1-alkene is at least 1:1.

5. A process according to claim 3 wherein sufficient water is added after the first reaction medium is contacted with the mineral acid to form a second reaction medium wherein the anhydrous mineral acid content is less than 65 weight percent, based on the total weight of water and anhydrous mineral acid, and heating the resulting second reaction medium to a tempearture and for a time sufficient to produce the desired reaction product comprising said fatty acid.

6. A process for the preparation of a fatty acid having from 5 to 17 carbon atoms which comprises:

reacting a charge stock comprising a 1-alkene having from 6 to 18 carbon atoms with a nitrosating agent comprising a mixture of NO and $NO_2$ wherein the molar ratio of NO to $NO_2$ is at least 1:1 in a substantially anhydrous first reaction medium comprising said charge stock, said nitrosating agent and a solvent consisting of a lower alkyl fatty acid having from 1 to 3 carbon atoms, under conditions of temperature and pressure such that said fatty acid solvent and 1-alkene are substantially entirely in the liquid phase and wherein the stoichiometric ratio of said nitrosating agent to said 1-alkene is at least 0.8:1 and wherein the amount of the solvent is at least 50 percent by weight of the nitrosating agent free reaction medium;

thereafter, without any intermediate separation, contacting said first reaction medium with an aqueous mineral acid selected from the group consisting of sulfuric and phosphoric acids, the molar ratio of anhydrous mineral acid to water being at least about 1.6:1 to form a second reaction medium wherein the molar ratio of the anhydrous mineral acid to the 1-alkene is at least 1:1 under reaction conditions including a temperature from about 60° to 160° C. for a time at least sufficient for gas evolution to substantially cease; and adding sufficient water to said second reaction medium to form a third reaction medium and decrease the anhydrous mineral acid concentration based on the water plus anhydrous mineral acid content to less than 65 weight percent, and heating the resulting third reaction medium to a temperature and for a time sufficient to produce the desired fatty acid.

7. A process according to claim 6 wherein the fatty acid solvent is acetic acid.

8. A process according to claim 7 wherein the mineral acid is sulfuric acid.

9. A process according to claim 7 wherein the sulfuric acid has an $H_2SO_4$ content from 90 to 99 weight percent.

10. A process according to claim 9 wherein the 1-alkene is 1-octene.

11. A process according to claim 7 wherein the anhydrous $H_2SO_4$ content in the third reaction medium is from 10 to 60 weight percent.

12. A process according to claim 11 wherein the reaction temperature in said third reaction medium is from 60° to 100° C.

13. A process according to claim 7 wherein the acetic acid solvent is recovered from said third reaction medium and is recycled to said first reaction medium.

References Cited

UNITED STATES PATENTS 3,518,302  6/1970  Ellis _____ 260—597 X

LORRAINE A. WEINBERGER, Primary Examiner

R. D. KELLY, Assistant Examiner

U.S. Cl. X.R.

260—404, 413, 465.2, 540, 644, 561 R